US 6,625,385 B2

(12) United States Patent
Collin et al.

(10) Patent No.: US 6,625,385 B2
(45) Date of Patent: Sep. 23, 2003

(54) ON-LINE EDITING AND DATA CONVEYING MEDIA FOR EDIT DECISIONS (75) Inventors: Daniel Collin, Quebec (CA); Charles Savoie, Quebec (CA)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 08/910,818

(22) Filed: Aug. 13, 1997

(65) Prior Publication Data

US 2002/0044759 A1 Apr. 18, 2002

(51) Int. Cl.[7] .................................................. H04N 5/93
(52) U.S. Cl. ........................................ 386/52; 386/55
(58) Field of Search ........................... 386/46, 52, 53, 386/54, 55; 345/328; 703/23

(56) References Cited

U.S. PATENT DOCUMENTS

| 5,404,316 A | * | 4/1995 | Klingler et al. ............. 345/328 |
| 5,469,270 A | * | 11/1995 | Yamamoto ................... 386/55 |
| 5,488,433 A | * | 1/1996 | Washino et al. .............. 386/55 |
| 5,568,275 A | * | 10/1996 | Norton et al. ................. 386/55 |
| 5,584,006 A | * | 12/1996 | Reber et al. ................... 386/55 |
| 5,649,046 A | * | 7/1997 | Stewart et al. ................. 386/52 |
| 5,649,171 A | * | 7/1997 | Craven et al. ................. 703/23 |
| 5,754,730 A | * | 5/1998 | Windrem et al. ............ 386/124 |
| 5,771,330 A | * | 6/1998 | Takano et al. ................. 386/52 |
| 6,016,380 A | * | 1/2000 | Norton .......................... 386/52 |

FOREIGN PATENT DOCUMENTS

EP          0438299 A2 *  7/1991

* cited by examiner

*Primary Examiner*—Huy Nguyen
(74) *Attorney, Agent, or Firm*—Gates & Cooper LLP (57) ABSTRACT Frames of image data (FIG. 5) are conformed from source material in response to an edit decision list (FIG. 2). Some of the image data is modified in an on-line environment (FIG. 3) and an output tape is produced including said modified frames. An output edit decision list (FIG. 7) is generated with conventional editing references (SRC, HINT) to the output tape. In addition, reference to the original source material are also included, encoded as comments.

26 Claims, 7 Drawing Sheets

```
Encoded (Online) EDL Output

TITLE SEQUENCE
0003   100  V  C  00000000  00003300  00000000  00000000  CR
701 — :SRC    02000000  02001500  002  00000000  00001500  CR
702 — :HINT   01595800  02001700
703 — :SRC    06351400  06353200  003  00001500  00003300  CR
704 — :HINT   06351200  06353400
START OF MAIN FEATURE
```

Encoded (Online) EDL Output

```
TITLE SEQUENCE 0003   100  V  C  00000000 00000000 00003300 00000000  CR
  SRC  02000000 02001500  002  00000000 00001500       CR
  HINT 01595800 02001700
  SRC  06351400 06353200  003  00001500 00003300       CR
  HINT 06351200 06353400

START OF MAIN FEATURE
```

701 — SRC line
702 — HINT line
703 — SRC line
704 — HINT line

*Figure 7*

ON-LINE EDITING AND DATA CONVEYING MEDIA FOR EDIT DECISIONS

FIELD OF THE INVENTION

The present invention relates to processing image data in an on-line editing system.

BACKGROUND OF THE INVENTION

On-line editing systems are known in which edit decisions are made with reference to the original source video material. Resulting output video, usually recorded onto videotape, then provides original material for broadcast or other purposes and therefore represents the final output product.

On-line systems are required to operate at full definition and are therefore expensive, particularly if they are to facilitate all of the creative tools available to an editor. Editing directly from video tape to create an output video tape may be referred to as linear editing, given that the time taken to locate a particular position on the video tape will be dependant upon the position of the frames physically on the tape. A recent trend has been towards non-linear editing in which video clips are digitised and stored on magnetic discs. In this way, particular video frames may be selected within a clip without having to rewind the tape such that the time taken to locate a particular clip is no longer related to its position within the overall sequence of frames.

Non-linear editing suites are known in which source material is captured and stored at a lower definition, usually using spatial compression techniques. Edit decisions are then made at this lower definition in an off-line editing process, resulting in a list of decisions being made which are written to a transport medium, such as a floppy disc, using decision list protocols. The edit decision list (or EDL) is then supplied to an on-line editing suite into which the source material is captured, this time at full resolution and an output tape is produced in response to the decisions defined in the list.

In addition to editing the source material, on-line systems often manipulate the input images, so as to define video effects etc., resulting in new source material being produced which cannot be derived from the original source material. Conventionally, therefore, once an output tape has been produced from an on-line system, the edit decision list is of no use and further operations must be performed upon the new output tape.

Recently, on-line systems have been provided with enhanced levels of functionality giving them non-linear access in a way substantially similar to that provided in off-line suites. It would therefore be desirable to allow output tapes to be viewed and, if necessary, to be re-manipulated within the on-line suite, preferably with reference to an edit decision list. However, as previously stated, the video information is often changed such that the original edit decision list is of no use.

SUMMARY OF THE INVENTION

According to a first aspect of the present invention, there is provided an on-line editing system comprising means for conforming frames of image data from source material in response to an edit decision list; means for modifying some of said image data; means for producing an output tape including said modified frames; and means for producing an output edit decision list with conventional editing references to said output tape and with references encoded as comments to the original source material.

In a preferred embodiment, the means for producing an output edit decision list includes means for writing said data to a data carrying medium. Preferably, said data carrying medium is a transportable magnetic disk.

Preferably, the means for producing an output edit decision list includes means for encoding said references as comments.

According to a second aspect of the present invention, there is provided a method of on-line editing video material, comprising steps of conforming frames of image data from source material in response to an edit decision list; modifying some of said input data; producing a video output including said modified frames; and producing an output edit decision list with conventional editing references to said video output and with encoded references to the original source material.

In a preferred embodiment, the encoded references are encoded as comments.

According to a third aspect of the present invention, there is provided a data conveying media having data encoded thereon representing an edit decision list having conventional references to edited video material and encoded references to source video material.

In a preferred embodiment, the conveying media is fabricated in the form of a magnetic disk and said magnetic disk may be transportable between machines. Preferably, the conventional references are created within a full bandwidth editing suite and said encoded references refer to edits performed by a previous editing operation using a reduced bandwidth editing suite. Preferably, the encoded references include capture hints for capturing source material.

DETAILED DESCRIPTION OF THE PREFERRED EMBODIMENTS

The invention will now be described by way of example only with reference to the previously identified drawings.

Figure 1:
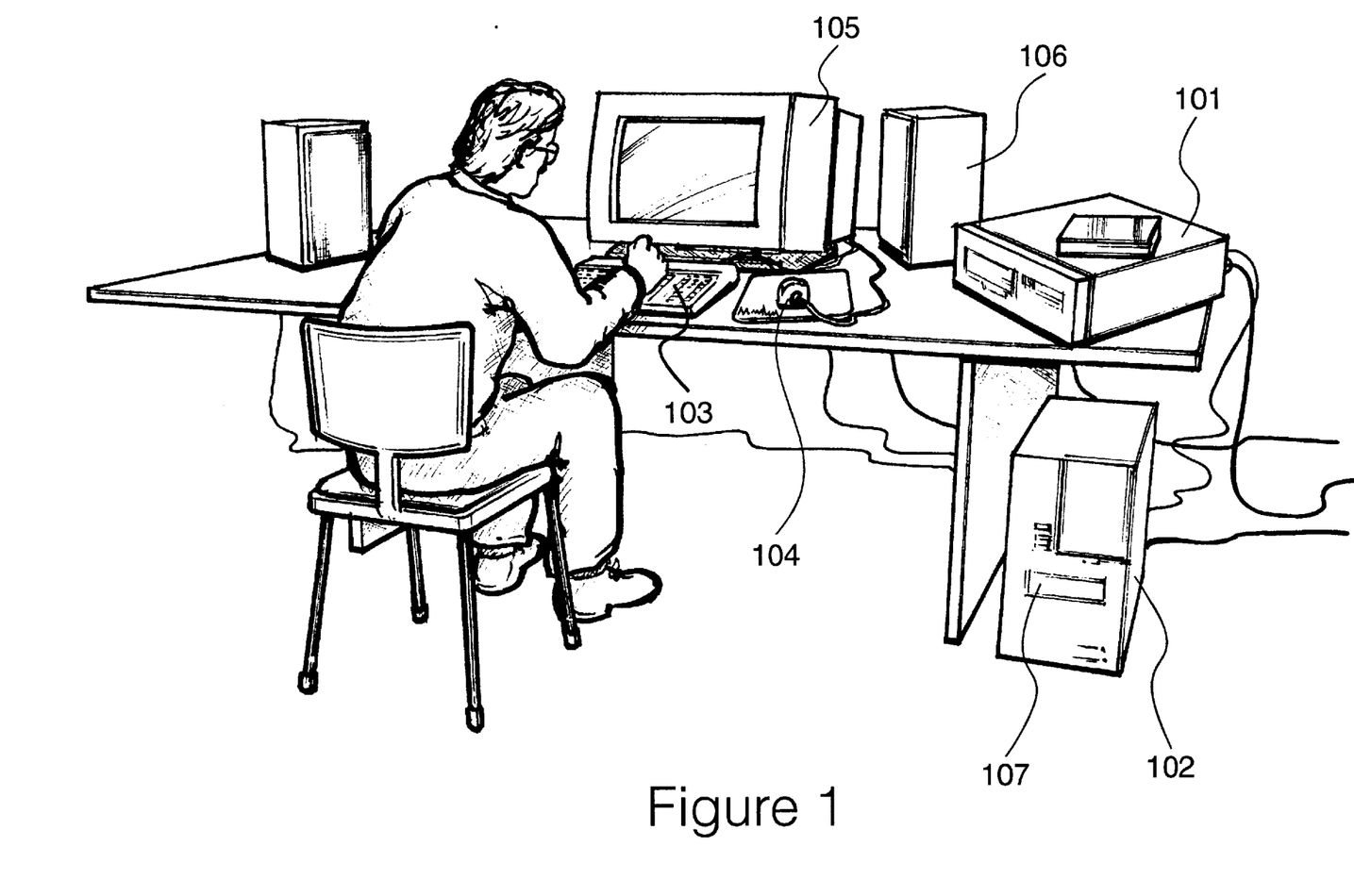
FIG. 1 shows an off-line editing suite arranged to write an edit decision list to a floppy disc.

An off-line editing suite is shown in FIG. 1, in which video source material is read by a video tape recorder 101 and applied to a processing unit 102, such as an IBM PC or similar having a single hard disc system of, typically, 1.2 gigabytes. The processing unit 102 includes a video card arranged to compress input video signals and is configured to perform off-line editing manipulations in response to manual operations effected by a keyboard 103 and a mouse 104.

Compressed video frames and a graphical user interface are displayed on a visual display unit 105 and audio signals are supplied to speakers 106 via an audio digital to analogue converter.

The processing system includes a floppy disc drive 107 arranged to receive edit decision list data generated by the processing unit 102 in response to manual operations made by an operator. At the start of an editing session, an operator is required to load source material videotapes into the video tape recorder 101. Video data is captured by the off-line editing system and each input source reel is identified by a unique number. Each tape is manually referenced with an identifying number or similar which is then identified to the off-line editing system.

Within the operating environment, video clips are displayed to an operator allowing said operator to perform non-linear editing operations. Thus, much of the creative work towards producing the final result may be performed within the off-line non-linear environment where the cost of system time is substantially less than what would be incurred within an on-line environment.

After an operator has completed an editing procedure, the system produces an edit decision list in response to the edits made by the operator which is then written to a floppy disc via drive 107.

Figure 2:
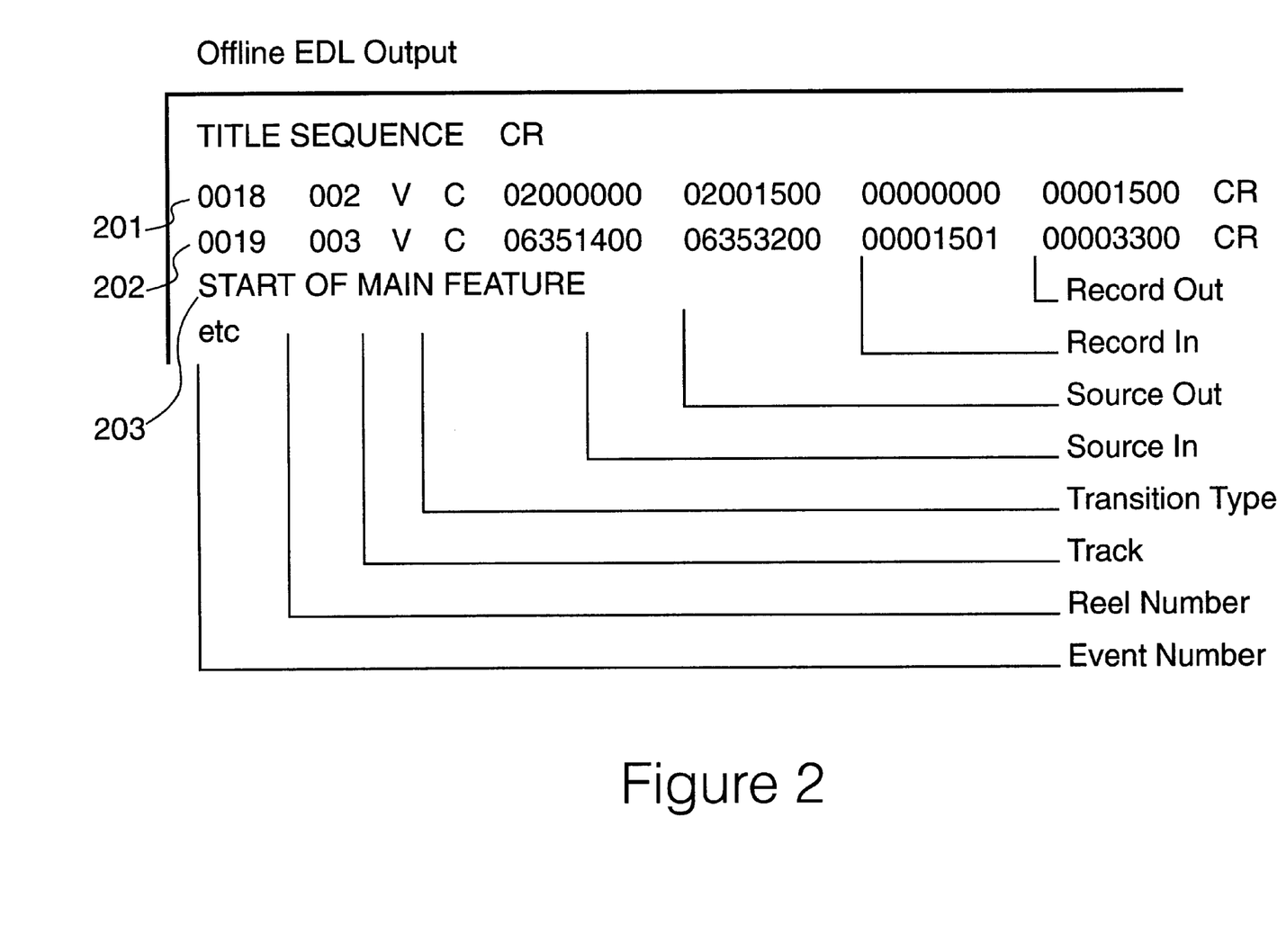
FIG. 2 represents an edit decision list of the type created by the system shown in FIG. 1.

An example of an edit decision list produced by a system of the type shown in FIG. 1, is presented in FIG. 2. The exact detail of an edit decision list format varies between different suites but many of the essential features of such a list are generic to most systems. The list essentially consists of a string of ASCII codes delimited by carriage return characters. Thus, as shown in FIG. 2, the list may be broken down into a plurality of lines, where a line terminates by a carriage return.

The first line of an edit decision list, such as line 201, is initiated by a number, such as 0018, representing the event number. The next number, 002 in line 201, represents a video tape reel number and this is followed by a letter identifying the track under consideration. In this environment, which is typical of its type, an output may consist of a video track with up to four audio tracks. Thus, a letter "V" at the track position represents the video track with similar letters being used to identify the audio tracks.

The next letter, a "C" in this example, represents the transition type, with the C representing a cut. A cut is the simplest of transition types and other transition types may be defined, such as dissolves and wipes etc. The transition type may also involve more sophisticated effects, possibly requiring the use of a digital video effects device whereupon the off-line system will only produce a representation of the effect with the full effect being generated during the on-line editing process.

The remainder of the line consists of four numerical time code representations. The first, 02:00:00:00, represent the source-in position. This identifies a unique frame within a source reel where the edit is to start. Thus, referring to the example, video frames are taken from the source commencing at the position defined by 02 hours, 00 minutes, 00 seconds, 00 frames. The next number represents the source out position, that is the final frame within the source clip, which has been defined as 02:00:15:00. Thus, the clip duration consists of 15 seconds of video and the total number of frames within this clip will depend upon the particular video system being used.

The next number at line 201 represents the record-in position followed by the record-out position. The difference between these values is always equivalent to the input values, in accordance with EDL convention, although the particular transition type defined may involve the video frames being extended or compressed. Thus, this being the first line, the clip is to be written to the start of the reel (all zeros) and written to position 00:00:15:00. The line is then terminated by a carriage return.

The next line 202 starts with the next event number which is represented as 0019. This event takes source material from real number 003 and performs a similar cut to produce video output. Thus, frames starting at position 06:35:14:00 and running through to position 06:35:32:00 are selected and joined to the next position of the video output clip. Thus, the record-in position is 00:00:15:01 and frames are written up until position 00:00:33:00 in the output clip. This line is then terminated by a carriage return character (as defined in accordance with the ASCII recommendations) identifying the start of the next line.

All edit decisions are initiated by an event number, as shown at line 201 and at line 202. If the line is not initiated with a number, the line is treated as being a comment. Thus, in the example shown, the next line (line 203) consists of the string "START OF MAIN FEATURE". This comment is merely to assist human operators and it is ignored by conventional on-line editing systems. Thus, any line which starts with a character other than a numerical character is treated as a comment and is not acted upon by the off-line editing system.

Figure 3:
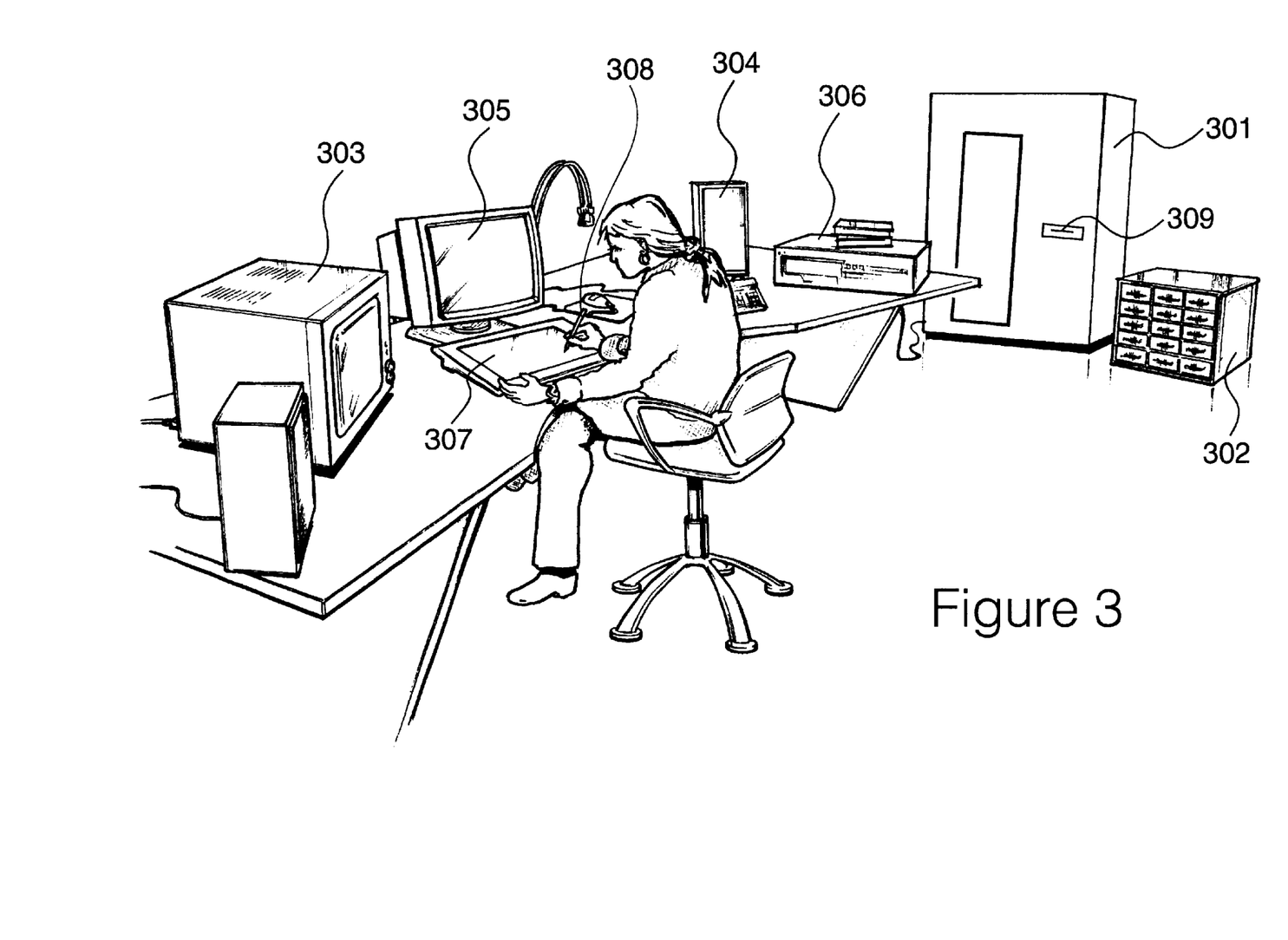
FIG. 3 shows an on-line edit suite arranged to receive the edit decision list shown in FIG. 2, including a high powered processing unit.

A digital non-linear on-line editing suite is shown in FIG. 3. In order to provide for substantially real-time processing of broadcast-quality video images, the system is provided with a substantial processing system 301, such as an Onyx manufactured by Silicon Graphics Inc. The Onyx system 301 operates with an array of hard disc units 302, configured to provide at least one full bandwidth video stream at video rate by striping video images over many discs within the array 302.

Output images from system 301 are supplied to a broadcast quality video monitor 303, with audio signals being supplied to studio reference audio monitors 304. Video images are also displayable on a visual display unit 305, also configured to display graphical user interface information and to present video clips in a graphical format so that editing decisions may be made. System 301 also communicates with a digital broadcast quality video tape recorder 306 and a graphics tablet 307. In addition to providing for the transmission of video signals from the video tape recorder 306 and back to said video tape recorder, control system 301 also interfaces with an RS422 control port on the video tape recorder such that operations of the video tape recorder may be controlled in response to manual operations of a stylus 308 upon the graphics tablet 307 and in response to edit decisions supplied to the control system 301 in the form of an edit decision list, receivable on a floppy disc medium insertable within a floppy disc drive 309. As required, system 301 is also configured to communicate with external equipment, such as digital video effects machines and rotoscoping stations etc.

An editing procedure may typically be initiated on an off-line system as that shown in FIG. 1, which would result in an edit decision list being produced of the type illustrated in FIG. 2. The edit decision list, along with the original source video material, is provided to an on-line editing suite of the type illustrated in FIG. 3, configured to generate a full bandwidth output reel of video tape conforming to the edit decisions established within the off-line suite.

Figure 4:
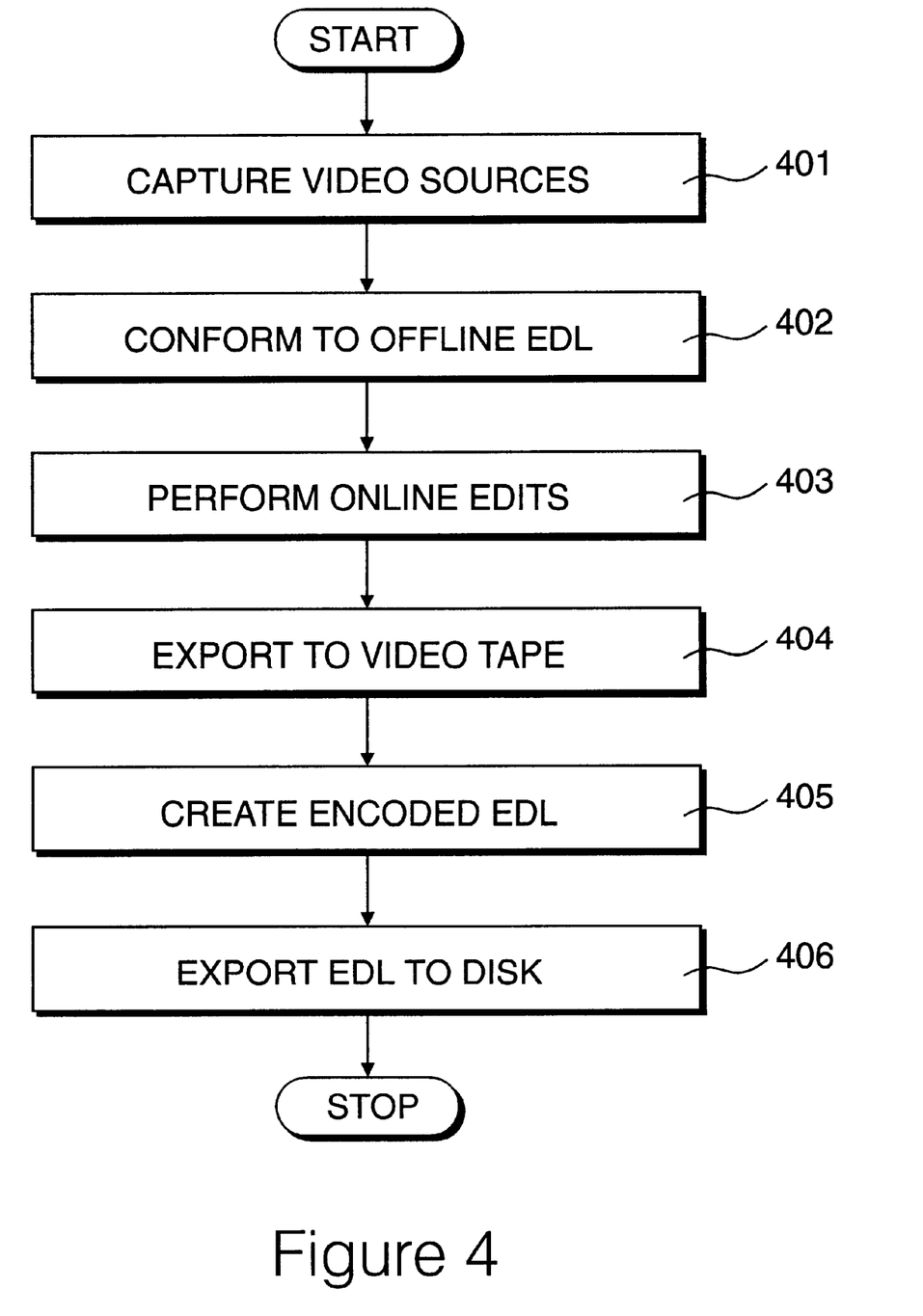
FIG. 4 identifies processes performed by the processing unit shown in FIG. 3, including a process for conforming an edit decision list and a process for creating an encoded edit decision list.

Procedures implemented within the on-line suite shown in FIG. 3 are identified in FIG. 4. At step 401 the original video source material is captured. The edit decision list defines a complete list of all video clips that are required in order to produce the final output reel. The system shown in FIG. 3 is configured to analyse this list and to produce a list of prompts to a user in response to this analysis. The capturing process 401 will involve identifying all of the clips that are required for each particular reel so that an input reel need only be loaded once into the video tape recorder 306.

The capturing process may also include optimisation routines which, for example, may result in a particular section being loaded only once in situations where the section is required more than once in the final output reel. Furthermore, it is usually assumed that further modifications will be made during the on-line editing process therefore each section will be loaded in such a way that its duration is slightly longer than what is actually defined in the edit decision list. Thus, in addition to the particular section itself, a pre-section and a post section will also be loaded, referred to as "handles". Furthermore, the operator may define default handle lengths. Thus, in some circumstances an operator may know that the off-line edit is more or less ideal and very little further modification is required. Under these circumstances, only relatively short handles are necessary. Alternatively, an on-line editor may be aware that an off-line edit requires substantial work therefore much larger handles may be preferable.

After all of the source material has been loaded at step 401, in response to prompts issued by system 301, system 301 performs a conforming process at step 402. This consists of analysing the edit decision list, with reference to the video sources captured at step 401, such that an output video stream may be produced, at full resolution, which conforms to the off-line edits defined in the system as shown in FIG. 1. This conforming process is controlled entirely by system 301 and does not require intervention on the part of the operator unless additional storage or other housekeeping operations are required.

In some situations the off-line editing suite shown in FIG. 1 may only be required to perform the conforming process at step 402 without any further manipulations being performed. However, in many situations the high performance on-line environment is justified on the basis that further modifications may be made at this stage. In addition, video effects, only hinted at within the off-line environment, are performed at full bandwidth definition with reference to external machines as and when required. Thus, an operator using the on-line environment shown in FIG. 3 may adjust cut positions, making use of previously loaded handles and perform compositing operations in which new video sections are generated derived by combining video source material and, as required, by adding new components such as graphics and video effects. Thus, after the on-line process identified at step 403, the final output is written to videotape, via video tape recorder 306. The output includes sections of video material which are merely copies of frames from the original source material along with frames which are not present within the original material and require an on-line system in order for their generation to take place. The exportation to video tape process, identified in FIG. 4 at step 404, would represent the end of the process in conventional on-line environments.

It can be appreciated that the off-line operations described with reference to FIG. 1 do not essentially involve the editing of video material but merely involve the editing of the edit decision list. Video material continues to reside on its source tapes and a further editing operation would consist of capturing the video sources (at reduced definition) loading the edit decision list, making modifications to the edit decision list and writing the edit decision list back to disc. The very nature of the process enables the edit decision list to be very portable such that a process may be initiated at a first station, whereafter the source material and EDL disc are supplied to a second station (possibly in another country), whereupon the information is loaded and the editing process continued. Modifications could be made and the source material and disc could be returned back to the originating station for even further edits to be performed. This process could be continued for as many iterations as required without any degradation occurring and without any compatibility problems occurring. The essential point to note throughout this process is that the original source material does not change and the edit decision list continues to make reference to this source material.

The situation is somewhat different in an on-line environment such as that shown in FIG. 3. After the final video information has been exported to video tape at step 404, an encoded edit decision list is created at step 405 and this encoded list is then exported to disk at step 406. The encoded edit decision list, produced as an output from the on-line editing suite, includes conventional EDL references to sections of video material contained within the output tape. Thus, all of the video material is referenced in conventional EDL format using the output tape from the on-line system in a substantially similar way in which input tapes would be used at the start of an editing procedure. Thus, any new material generated during the on-line process can be referenced in an EDL because reference may be made to the new video reel. However, a problem arises in that each video section has been edited to its adjoining section add therefore there is no possibility of obtaining handles. However, this problem is overcome because the edit decision list also makes reference to the original source material from which the appropriate sections, including handles, may be derived. Such references are encoded as comments within the EDL such that the EDL and its associated tape may be used in conventional suites using conventional EDL terminology. However, enhanced on-line suites, in accordance with the present invention, decode the encoded comments thereby enabling them to also make reference to the original source material.

Figure 5:
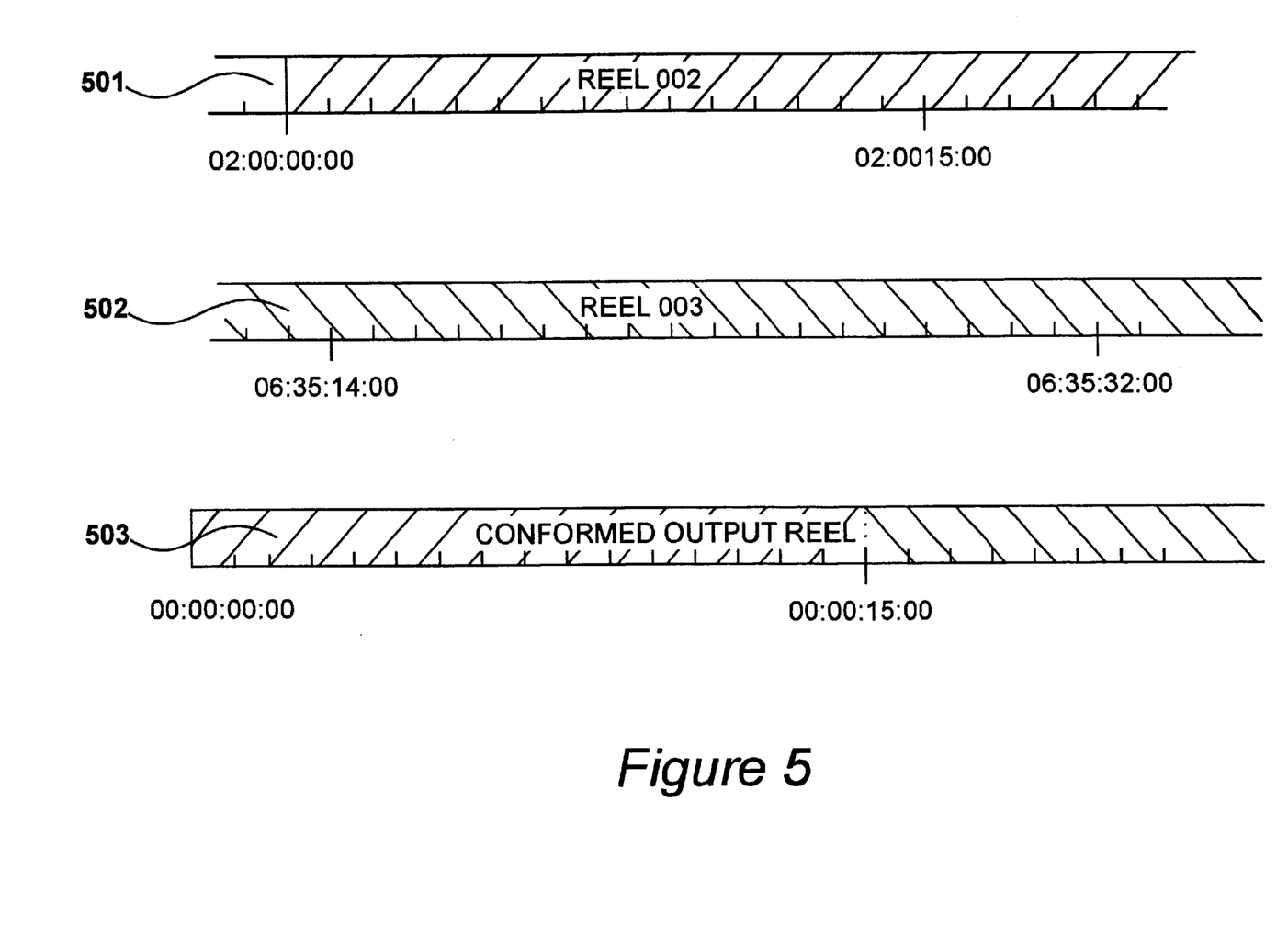
FIG. 5 shows an example of a conformed edit decision list produced in response to the process identified in FIG. 4.

An example of video reels produced by the on-line editing suite of FIG. 3 is shown in FIG. 5. As described reference to FIG. 2, a title sequence is made up by editing a 15 second section from reel 002 with a section from reel 003, referenced as event 0018 and 0019 respectively in FIG. 2.

Reel 002 is illustrated in FIG. 5 as clip 501 with reel 003 being similarly referenced as clip 502. The resulting output reel is referenced as clip 503 and consists of a section starting at 00 hours 00 minutes, 00 seconds, 00 frames and running until 00 hours 00 minutes, 15 seconds, 00 frames. Thereafter, the section starting at 06 hours 35 minutes, 14 seconds, 00 frames is selected from clip 502 running to 06 hours, 35 minutes, 32 seconds, 00 frames which is then added to clip 501 in the output reel to form part of said output clip 503. Thus, clip 501 and 502 may be considered as part of the original source material with clip 503 representing part of the output tape.

Figure 6:
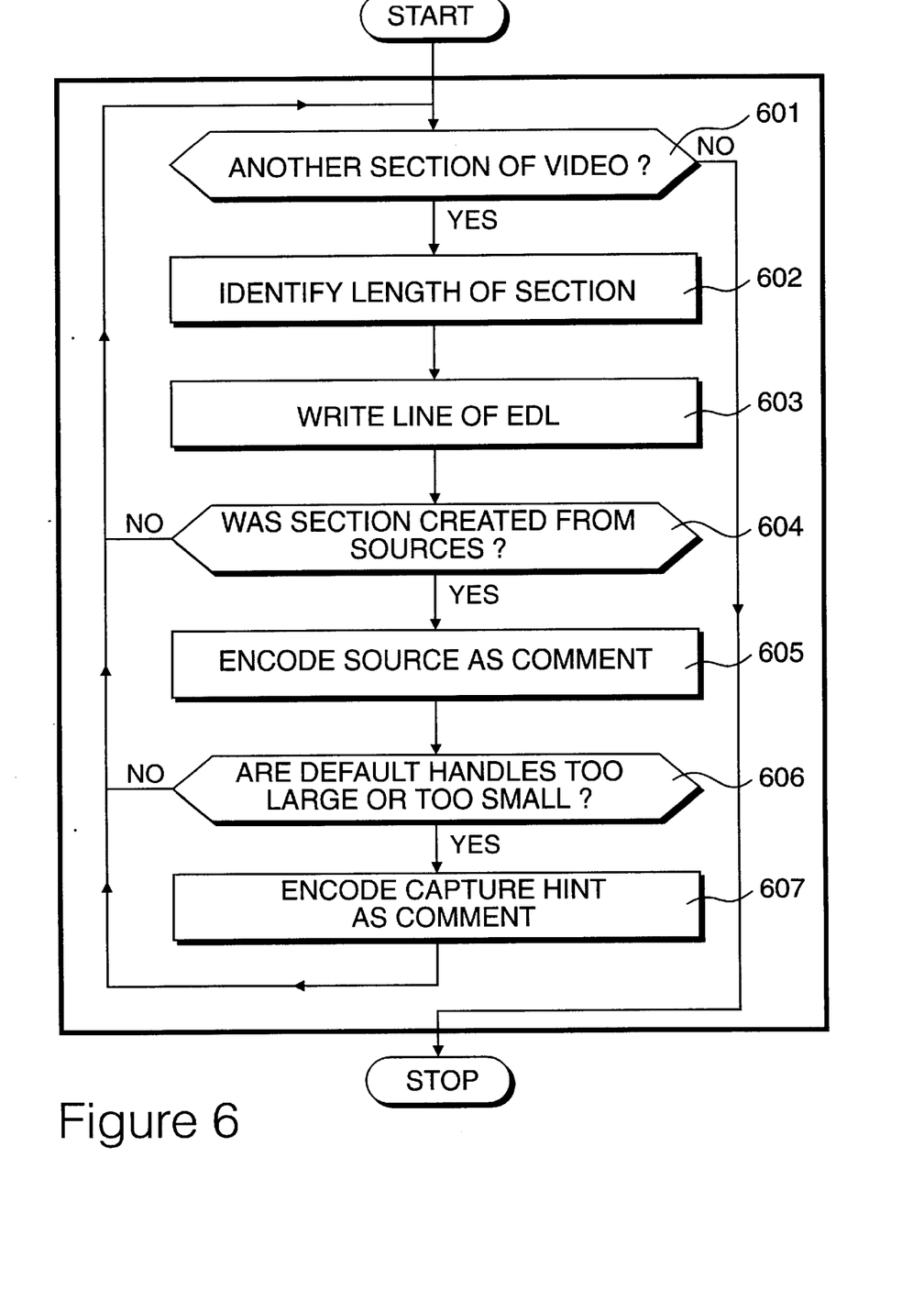
FIG. 6 details the encoded edit decision list creation process identified in FIG. 4; and, FIG. 7 shows an example of an encoded edit decision list produced by the process detailed in FIG. 6, in response to the input edit decision list shown in FIG. 2.

Process 405 for the creation of an encoded edit decision list, identified in FIG. 4, is detailed in FIG. 6.

At step 601 a question is asked as to whether another section of video material is present within the output reel.

Each section of material in the output reel is identified by its transition such that clip 503 in FIG. 5 may be considered as consisting of a first section 501 combined with a second section 502. Thus, if the total reel included just these two sections, the first section would be identified on a first iteration of the process shown in FIG. 6 with the second section being identified on the second iteration.

At step 602 the length of the section is identified, thereby enabling a line of data to be written into the encoded edit decision list at step 603.

At step 604 a question is asked as to whether the section identified at step 602 was derived from input sources. If the section under consideration has undergone manipulation within the on-line editing system, it is not possible to derive this particular section from the original source material. Consequently, no further information may usefully be placed within the edit decision list and the question asked at step 604 is answered in the negative. Alternatively, the section identified at step 602 may be a mere copy of frames derived from the input source material. Under these circumstances, further editing procedures may be implemented with reference to the source material in preference to obtaining image frames from the output tape. The question asked at step 604 is therefore answered in the affirmative and at step 605 a further line is added to the edit decision list encoded in the form of a comment.

At 606 the default handle length for the equipment may be considered with reference to the particular section under consideration. If the default handles are considered appropriate, the question asked at step 606 will be answered in the negative and control will be returned to step 601. Alternatively, the default handles may be considered as being too large or too small and may often be considered as being too large. Under these circumstances, too much information would be read from the source material and, in order to optimise overall performance, further information is added at step 607 in the form of an encoded capture hint, thereby instructing subsequent on-line processing systems to capture specified lengths of video clips from the source material, whereafter control is returned to step 601.

Eventually, all of the sections present within the output video reel will have been considered, resulting in the question asked at step 601 being answered in the negative and control being directed to step 406.

Figure 7:
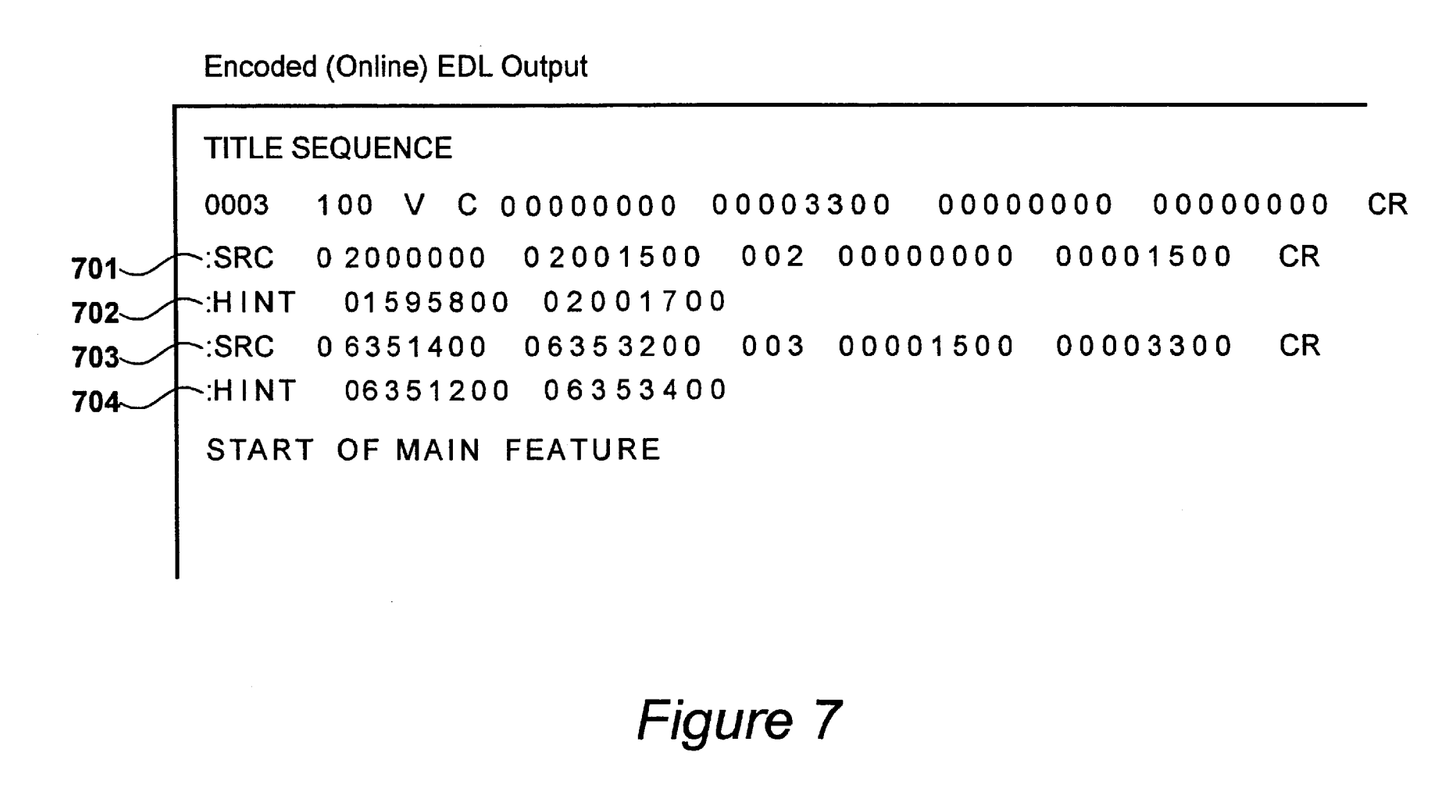

The resulting encoded on-line edit decision list output exported at step 406 is detailed in FIG. 7. The encoded edit decision list produced from the on-line system is substantially similar to the off-line output illustrated in FIG. 2. Thus, a normal entry consists of an event number, a reel number, a track being generated (video or audio), a transition type, a source-in value, a source-out value, a record-in value and a record-out value. However, conventional entries initiated by an event number, will make reference to the edited output tape and not to the original source material. Thus, whereas the title sequence was specified by events 0018 and 0019 in FIG. 2, the whole of the title sequence may now be defined by event 0003, making reference to reel number 100 which is the number given to the output reel. A conventional editing system reading the edit decision list would interpret this event number and then proceed to the next event number, forming part of the main feature. However, as shown in FIG. 7, the on-line edit decision list also includes encoded comments from which the original edit decision list may be derived along with further hints as to the actual capturing of material from the source reels.

Event 0003 is followed by lines 701, 702, 703 and 704, each preceded by a colon or other suitable code which would be ignored as a comment by conventional systems but interpreted by systems embodying the present invention. In this embodiment, a colon (:) identifies a string of characters up to a carriage return as being an encoded comment making reference to the original source material.

Line 701 consists of a colon followed by the code SRC, interpreted as a source definition. The next numbers, consisting of 02000000 and 02001500 are source in and source out values derived from event 0018 of the original list. This is followed by numerals 002 identifying the reel number, therefore it can be appreciated that an encoded reference, such as that provided at line 701, also differs from a conventional reference in that the order of the entries is rearranged somewhat. Thereafter, references identify the record-in and record-out positions, again derived from event 0018. Line 702 specifies a capture hint in order to facilitate the reading of frames specified by source line 701. Line 702 is initiated by a colon followed by the code "HINT". It comprises a source-in value 01595800 and a source-out value, 02001700', each slightly outside the source values specified at line 701. Thus, as shown in this example, two-second handles are recommended by the hint during the capture process.

Line 703 is substantially similar to line 701 with reference to information derived from event 0019. Similarly a capture hint for this source material is provided at line 704.

In the embodiment disclosed above, the conventional edit decision list information makes reference to the new video reel, with only the encoded information making reference to the originating tapes. In an alternative embodiment, the conventional edit decision list information may make reference to the originating tapes when the material has not been modified. Where the information has been modified, the conventional edit decision list instructions refers to the new output reel. The encoded data therefore only makes reference to portions of the video material which have been modified by the on-line process.

What we claim is:

1. A method for on-line editing, comprising:
   (a) modifying, in an on-line editing environment, one or more frames of machine-readable image data from a source in accordance with a first edit decision list;
   (b) producing, in the on-line editing environment, machine-readable video output comprising the one or more modified frames and;
   (c) producing, in the on-line editing environment, a second edit decision list, wherein said second edit decision list is readable by a conventional on-line video editing system and comprises:
      (i) conventional on-line editing information for the contents of the video output; and
      (ii) one or more encoded references to the image data from the source that was used to produce the video output, wherein said encoded references are configured to be ignored as a comment of said second edit decision list when processed by a conventional on-line video editing system and to be used in said on-line editing environment to derive said first edit decision list and make reference to the original source material.

2. The method of claim 1 further comprising writing the second edit decision list to a data carrying medium.

3. The method of claim 1 wherein the references to the image data from the source comprise comments.

4. The method of claim 1 wherein the one or more modified frames are stored on an array of magnetic discs.

5. The method of claim 1 further comprising generating, in the on-line editing environment, new machine-readable source material that is produced into the video output.

6. The method of claim 1 wherein the references to the image data from the source identify a position of clips in the source.

7. The method of claim 1 wherein the references to the image data from the source comprise capture hints for capturing portions of one or more frames from the source.

8. The method of claim 7 wherein:
the modifying of the one or more frames results in a clip having a duration; and
the capture hints comprise handles, effectively extending the duration of the clip beyond the duration included with the modification of the one or more frames.

9. The method of claim 1 wherein the on-line editing environment provides for modifying the one or more frames from the source at full resolution.

10. The method of claim 1 wherein the first edit decision list was created in a non-linear editing environment.

11. An on-line video editing apparatus comprising a video editing means configured to:
(a) modify, in an on-line editing environment, one or more frames of machine-readable image data from a source in accordance with a first edit decision list;
(b) produce, in the on-line editing environment, machine-readable video output comprising the one or more modified frames;
(c) produce, in the on-line editing environment, a second edit decision list, wherein said second edit decision list is readable by a conventional on-line video editing system and comprises:,
(i) conventional on-line editing information for the contents of the video output; and
(ii) one or more encoded references to the image data from the source that was used to produce the video output, wherein said encoded references are configured to be ignored as a comment of said second edit decision list when processed by a conventional on-line video editing system; and
(d) use, in the on-line environment, said encoded references to derive the first edit decision list and refer to the original source material.

12. The apparatus of claim 11 further comprising an output means configured to write the second edit decision list to a data carrying medium.

13. The apparatus of claim 11 wherein the references to the image data from the source comprise comments.

14. The apparatus of claim 11 wherein the one or more modified frames are stored on an array of magnetic discs.

15. The apparatus of claim 11, the video editing means further configured to generate, in the on-line editing environment, new machine-readable source material that is produced into the video output.

16. The apparatus of claim 11 wherein the references to the image data from the source identify a position of clips in the source.

17. The apparatus of claim 11 wherein the references to the image data from the source comprise capture hints for capturing portions of one or more frames from the source.

18. The apparatus of claim 17 wherein:
the modifying of the one or more frames results in a clip having a duration; and
the capture hints comprise handles, effectively extending the duration of the clip beyond the duration included with the modification of the one or more frames.

19. The apparatus of claim 11 wherein the on-line editing environment provides for the video editing means to modify the one or more frames from the source at full resolution.

20. The apparatus of claim 11 wherein the first edit decision list was created in a non-linear editing environment.

21. A data conveying medium having data encoded thereon, the data representing a second edit decision list produced in an online editing environment, the second edit decision list comprising:
conventional on-line editing information for the contents of one or more modified frames, wherein the one or more modified frames were modified in an online editing environment from source image data in accordance with a first edit decision list; and
one or more encoded references to the source image data, wherein said encoded references are configured to be ignored as a comment of said second edit decision list when processed by a conventional on-line video editing system and to be used in said on-line environment to derive said first edit decision list and make reference to the original source material.

22. The data conveying medium of claim 21 wherein the encoded references to the source image data are encoded in comments.

23. The data conveying medium of claim 21 wherein the references to the source image data identify a position of clips in the source image data.

24. The data conveying medium of claim 21 wherein the references to the source image data comprise capture hints for capturing portions of one or more frames from the source image data.

25. The data conveying medium of claim 24 wherein:
the conventional online editing information provides for a clip having a duration; and
the capture hints comprise handles, effectively extending the duration of the clip beyond the duration included in the conventional online editing information.

26. The data conveying medium of claim 21 wherein the first edit decision list was created in a non-linear editing environment.

* * * * *